(12) United States Patent
Galland et al.

(10) Patent No.: US 8,037,815 B2
(45) Date of Patent: Oct. 18, 2011

(54) MARKING DEVICE SUPPORT ON PIVOTABLE CRADLE CARRIED BY TROLLEY

(75) Inventors: Jean-Marc Galland, Theize (FR); Gerard Barraud, Rivolet (FR)

(73) Assignee: SIC Marking, Lissieu (FR)

( * ) Notice: Subject to any disclaimer, the term of this patent is extended or adjusted under 35 U.S.C. 154(b) by 873 days.

(21) Appl. No.: 11/662,275

(22) PCT Filed: Sep. 9, 2005

(86) PCT No.: PCT/FR2005/002246
§ 371 (c)(1),
(2), (4) Date: Mar. 28, 2008

(87) PCT Pub. No.: WO2006/030117
PCT Pub. Date: Mar. 23, 2006

(65) Prior Publication Data
US 2008/0302254 A1    Dec. 11, 2008

(30) Foreign Application Priority Data

Sep. 10, 2004  (FR) ........................... 04 09655
Oct. 18, 2004  (FR) ........................... 04 10987

(51) Int. Cl.
*B44B 5/00* (2006.01)
*B23Q 1/48* (2006.01)

(52) U.S. Cl. ............... 101/3.1; 101/4; 409/211
(58) Field of Classification Search ........... 101/3.1, 101/4; 400/127; 409/190, 191, 201, 211, 409/216; 30/277; 81/9.2, 9.22
See application file for complete search history.

(56) References Cited

U.S. PATENT DOCUMENTS

| | | | | |
|---|---|---|---|---|
| 3,460,435 A | * | 8/1969 | Dahl et al. | 409/183 |
| 3,992,819 A | | 11/1976 | Schmall | 451/2 |
| 4,618,758 A | | 10/1986 | Gilli et al. | 219/121.67 |
| 5,238,340 A | * | 8/1993 | Ochiai et al. | 409/201 |
| 5,862,749 A | * | 1/1999 | Lizarazu | 101/3.1 |

FOREIGN PATENT DOCUMENTS

| | | |
|---|---|---|
| DE | 3735422 | 5/1989 |
| FR | 2256833 | 8/1975 |
| FR | 2639860 | 6/1990 |
| FR | 2875173 | 3/2006 |

* cited by examiner

*Primary Examiner* — Daniel J Colilla
(74) *Attorney, Agent, or Firm* — Clark & Brody

(57) ABSTRACT

The invention concerns a marking device comprising a support frame, marking means including a marking member and means for moving the marking member parallel to two mutually perpendicular movement planes and to the surface to be marked to produce, on the surface to be marked, two-dimensional symbols inscribed in a marking window. The invention is characterized in that it comprises means for compensating, at least partly, the influence of the rotation over the distance between the marking member and the marking point of the surface to be marked.

10 Claims, 3 Drawing Sheets

MARKING DEVICE SUPPORT ON PIVOTABLE CRADLE CARRIED BY TROLLEY

This present invention concerns the technical area of devices used for marking the surface of an object, by deformation of the latter in particular.

Thus, in the above area, we are familiar with the marking of metal objects by micro-percussion techniques, using a marking system that includes a point which is driven with a linear alternating movement and that strikes the surface to be marked, in order to effect more or less individual impacts.

It is then possible, by moving the marking implement in two crosswise directions, to create two-dimensional symbols on the surface to be marked.

In order to obtain this crosswise movement of the marking implement, it has been proposed, as described, for example, in patent applications FR 2 839 860 and FR 2 256 833, that the marking implement should be moved firstly in linear motion, and secondly in rotation around an axis parallel to the direction of linear motion.

Thus, it is possible, by combining these movements of linear and rotary motion, to move the marking implement within a window, also known as the marking window, determined by the amplitude of the linear and rotary motions. Devices that operate on this principle can in fact be used in order to create two-dimensional symbols of good quality when the rotary amplitude of the marking implement is low. However, during the execution of large-dimension markings, involving a large rotary amplitude, it has been observed that the marking points located in the immediate vicinity of the extreme edges of the marking window determined by rotating the marking implement, are not of such good quality as the marking points executed at the centre of the window, in the region requiring only a very low rotary amplitude of the marking implement.

Thus, a need has arisen to find a solution to this degradation of the quality of the marking in large marking windows, while still retaining the principle of moving the marking implement by pivoting the latter in at least one of its marking directions. In fact, such an action would reduce the general bulk of the marking device, in particular regarding the dimensions imposed by the action adopted for the movement obtained by rotating the marking implement.

In order to achieve this objective of achieving good marking quality at all points of the window, including for large rotary amplitudes of the marking implement, the invention concerns a device for the marking of a surface that includes:
  a supporting chassis,
  marking means that include a marking implement designed to create a point or a mark that is more or less individual,
  and means for moving the marking implement parallel to two planes of motion perpendicular to each other and to the surface to be marked in order to create two-dimensional symbols on the surface to be marked located within a marking window determined by the amplitude of the movements of the marking implement, where the movement of the marking implement parallel to the movement plane is achieved by at least one rotation of the marking implement around an axis parallel to the other movement plane.

According to the invention, the marking device is characterised in that it includes means to at least partially compensate for the influence of the rotation on the distance between the marking implement and the marking point on the surface to be marked. In the context of the invention, "compensation means" refers to means that compensate, automatically, for the influence of the rotation on the distance between the marking implement and the marking point on the surface to be marked. To this end, the compensation means are slaved to the rotation of the marking implement, in such a way that compensates automatically for the influence of the rotary motion.

Thus, by the use of the compensation means, the marking points created by the marking implement are all of good quality in every part of the marking window.

According to the invention, the compensation can be effected more or less completely.

Thus, according to one characteristic of the invention and in the context of partial compensation, the compensation means are designed to maintain at a constant value the distance measured perpendicular to the marking surface, between the marking implement and the surface to be marked.

According to another characteristic of the invention, and when one is seeking total compensation of the effects of rotating the marking implement, the compensation means are designed to maintain at a constant value the distance between the marking implement and the marking point on the surface to be marked.

According to the invention, the marking means can be of different natures and, for example, can perform the marking by a local deformation of the surface to be marked, where this deformation can be the result of an impact or punch action or, again, of a local melting of the material comprising the surface to be marked or engraved.

Thus, when the marking is effected by individual punch actions on the surface to be marked, according to one characteristic of the invention, the marking means include a micro-percussion system that uses as its marking implement a marking point that moves with an alternating linear motion in one direction, called the marking direction, between a rest position and a marking position, with the rest position of the marking point being the reference for measuring the distance between, firstly, the marking implement and, secondly, the surface to be marked or the marking point.

When the marking is effected by local melting of the surface to be engraved, the marking means, according to another characteristic of the invention, include a laser source and, as a marking implement, a marking lens intended to focus a laser spot in one direction, called the marking direction, onto the surface to be marked, with the optical centre of the marking lens being the reference for measuring the distance between, firstly, the marking implement and, secondly, the surface to be marked or the marking point.

In fact, it has been observed that, in the context of a marking process using a laser source and in order to use all the energy of the laser beam, it is necessary to effect the best possible focussing of the laser beam onto the surface to be marked, and this is an objective that is attained by the use of the compensation means according to the invention.

It should be noted that micro-percussion marking or laser marking both have the common characteristic of acting in one marking direction corresponding, in the case of micro-percussion, to the direction of oscillation in linear motion of the marking point and, in the context of the laser, to the of the beam itself.

According to the invention, the compensation for the influence of rotating the marking implement can be achieved in different ways. Thus, according to one method of implementation, the compensation means are designed to induce a linear motion of the marking implement in relation to axis $\Omega$, and in direction $\Delta$ perpendicular to axis $\Omega$, during the rotation of the marking implement around axis $\Omega$.

This linear motion of the marking implement, induced during its rotation, can then be effected in different ways, which can be chosen as a function of the general action of the device, of the dimensions sought, or indeed of the precision to be achieved in the compensation process, given that the latter remains dependent upon the operating play of the action adopted.

According to one implementation variant of the invention, the compensation means include at least one cam meshing with a cam race whose profile is designed to induce the linear motion of the device in direction Δ.

According to another implementation variant, the compensation means include at least:
- means to determine a reference area,
- and means for connection of the marking implement to the reference area, so as to induce the linear motion of the marking implement in direction Δ.

The distance between the marking implement and the reference area can, in certain cases, be parallel to the surface to be marked, thought this is not strictly necessary for the implementation of the invention.

According to the invention, the movement of the marking implement, parallel to one of the planes of motion, is necessarily obtained by a movement involving a rotation of the marking implement around an axis perpendicular to this movement plane, while the movement parallel to the other movement plane can be obtained, either by a pure linear motion, or also by a rotation on an axis perpendicular to this other movement plane.

In a preferred but not limiting form of implementation of the marking device of the invention, for which the movement of the marking implement is effected by combining a linear motion and a rotation on an axis parallel to the axis of linear motion, the means for moving the marking implement include at least:
- a channel which is connected to the chassis in a thorough manner, and which provides guidance in linear motion for a trolley in one direction parallel to the plane and to the surface to be marked,
- motor-drive means for movement of the trolley in linear motion in both directions along the guidance channel,
- an oscillating cradle which supports the marking implement at least, and which is fitted to the trolley so as to at least pivot in relation to the trolley on the axis parallel to the direction,
- and motor-drive means for movement in rotation, in both directions, of the cradle on the axis.

According to the invention, the motor-drive means for movement of the trolley in rotation can then be attached to the trolley or can be attached to the chassis.

In a preferred variant, the cradle is connected to the trolley on a face that is oriented toward the surface to be marked, and the marking implement is fitted to the cradle opposite to the trolley, while the motor-drive means for movement of the cradle in rotation include at least one arm, one of whose ends is connected to the cradle and whose other end is located opposite to the first and equipped with a toothed sector meshing with a sprocket wheel driven in rotation by a motor.

In a more particularly preferred of this marking device, the marking system is a micro-percussion system which includes an electromagnetic solenoid, within which is placed a ferromagnetic core which acts upon a marking point, and which is mobile in linear motion in the solenoid, between a rest position and a marking position.

The compensation means then include a mobile stop device, against which the core rests in the rest position, which is associated with a finger forming a cam and meshing with a cam race attached to the trolley, so that a rotation of the cradle drives a movement of the finger along the cam race, whose profile is designed to change the rest position of the core and of the marking point, as a function of the angular position of the cradle.

It should be observed that, in this preferred form of implementation of the marking device of the invention, the fact that the linear guidance channel is fixed, and undergoes no rotary movement, allows a reduction in the mass of the equipment that has to be moved in rotation, resulting in a reduction of the moment of inertia in rotation, allowing an increase in the speed of motion of the marking implement.

Nevertheless, according to the invention, such a method of implementation of the movement means is not strictly necessary, and the action of the means for moving the marking implement can include some rotation of the guidance channel.

Thus, according to another method of implementation of the invention, the means for moving the marking implement include at least:
- a linear guidance channel which follows a direction parallel to the plane and to the surface to be marked, and which is fitted to the chassis so as to be mobile at least in rotation around the axis,
- a trolley which is fitted to the guidance channel so as to be mobile in linear motion along the latter, and which is connected to the marking implement,
- motor-drive means for linear movement of the trolley,
- and motor-drive means for movement in rotation of the guidance channel.

In the context of such an action, it is possible to envisage different forms of implementation of the compensation means.

According to one of the envisageable forms, maintenance of the effectiveness distance is achieved at the action of the guidance channel.

To this end, the means for moving the marking implement are also implemented so that:
- the guidance channel is fitted to the chassis so as to be mobile in radial linear motion in one direction perpendicular to the axis,
- and the motor-drive means for rotation of the guidance channel include the compensation means, and are designed to induce, during the rotation of the guidance channel, a linear motion of the said guidance channel.

In the context of this implementation variant, and according to another characteristic of the invention, it is then possible to envisage that:
- the means for movement in linear motion of the guidance channel include two arms, each placed at one of the two ends of the guidance channel, and fully attached to the guidance channel,
- each arm includes, firstly, an axial rectilinear elongated aperture parallel to a marking axis of the marking implement and engaged on a pin connected to the chassis, and secondly, a window which is curved inward and forms a cam race for a cam connected to the chassis, and whose profile is designed so as to induce a linear motion of the arms and of the guidance channel in the direction concerned during a rotation of the arms and of the guidance channel,
- and at least one of the arms has a toothed sector that meshes with a sprocket wheel driven by a motor.

Various other characteristics of the invention will emerge from the description that follows, provided with reference to the appended drawings, which illustrate different non-limiting forms of implementation of the marking device of the invention.

Figure 2:
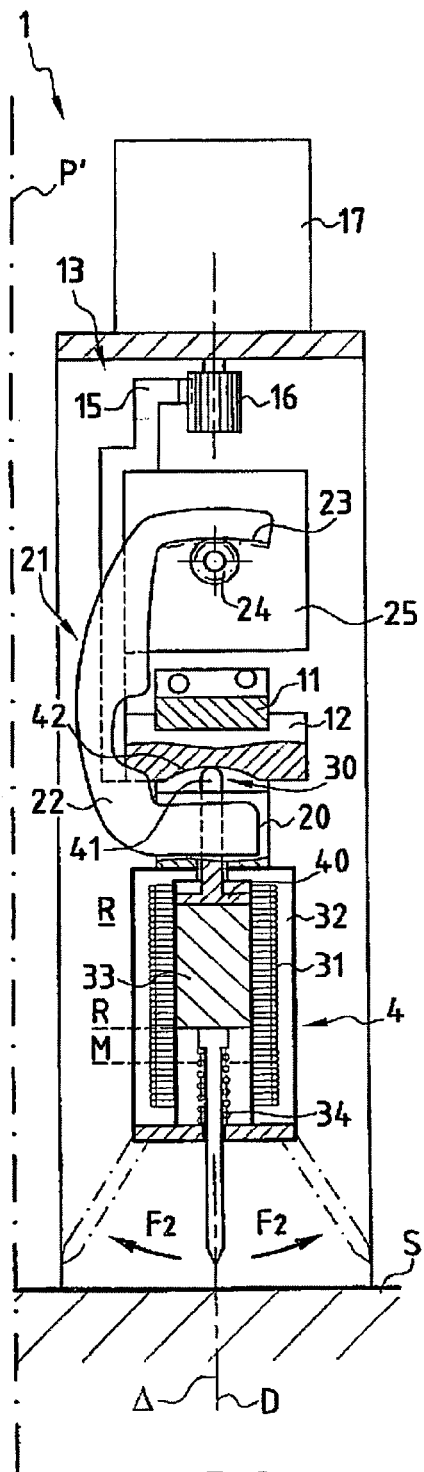
FIG. 2 is a schematic view in partial section along line II-II of FIG. 1.
Figure 1:
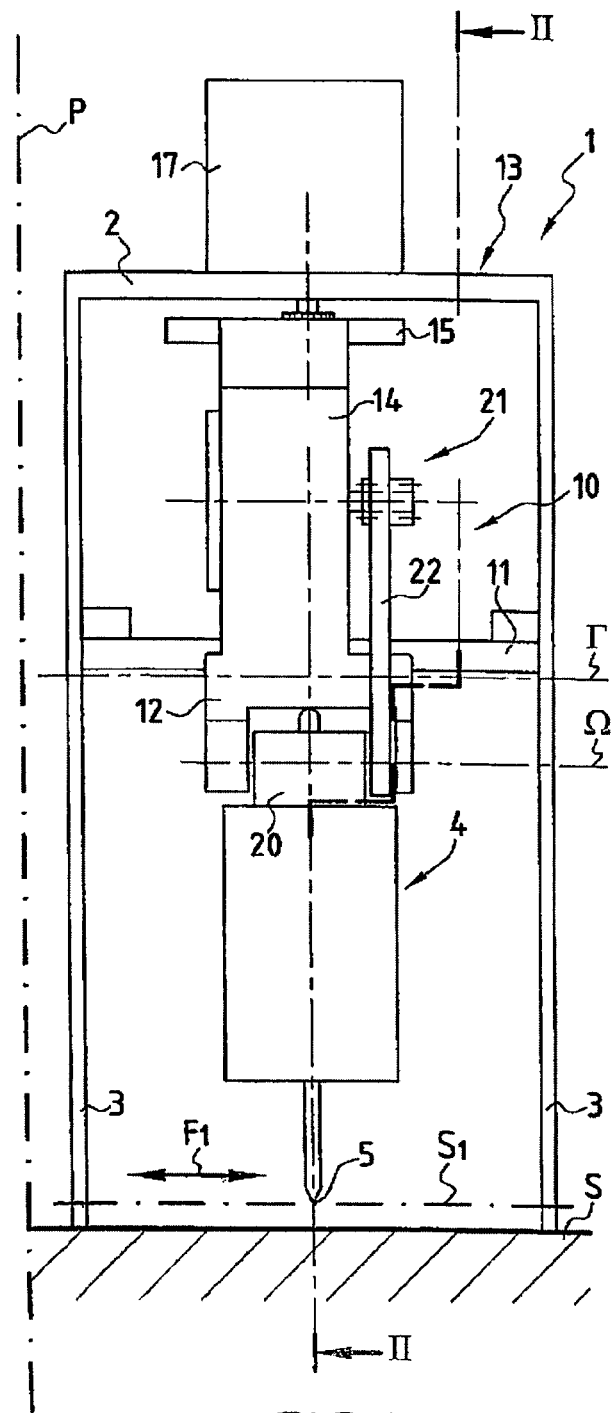
FIG. 1 is a schematic side elevation of a first method of implementation of a marking device according to the invention, employing a micro-percussion system with electromagnetic drive.

A marking device according to the invention, as illustrated schematically in FIGS. 1 and 2, and referenced as a whole by the reference 1, includes a supporting chassis 2 which, in the example illustrated, has two lateral legs 3, intended to rest on the surface to be marked S.

The presence of the legs 3 corresponds to a method of portable implementation which renders the device 1 capable of being transported from place to place by its user, according to need. Of course the presence of the legs 3 is not strictly necessary for the implementation of a marking device according to the invention, which could also be fitted to support arm, so that the legs 3 would then become redundant.

The device 1 also includes marking means 4 which, in the example illustrated, are implemented in the form of an electromagnetic micro-percussion system that uses, as its marking implement, a marking point 5 whose end is intended impact upon the surface S to create hollow or impact-point markings, as will be described below.

To the extent that the marking point creates marks that are more or less individual and, where it is desired in accordance with an objective of the invention, to create two-dimensional symbols on the surface S, the marking device 1 also includes means 10 for movement of the marking implement 5.

In the example illustrated, the movement means 10 include a linear guidance channel 11, which is connected to the chassis 2. In the example illustrated, the linear guidance channel 11 is created in the form of a guide rail, as can be purchased commonly, fixed at both ends to the chassis 2. Of course, the linear guidance channel 11 can be created in any other way, as described for example in patent application FR 2 256 833.

According to the method of implementation illustrated, the guidance channel 11 is fully connected to the chassis, so that it cannot undergo any relative movement in relation to the latter.

The movement means 10 also include a trolley 12 which is fitted to the guidance channel 11, so as to be mobile in linear motion in one direction $\Gamma$, parallel to the movement plane P'. In order to provide for the linear movement of the trolley 12 along the channel 11, motor means 13 are also provided for linear movement of the trolley. These motor means 13 include an arm 14 which extends from the trolley 12 and away from surface S. At its end opposite to the trolley 12, the arm 14 has a rack 15 which is parallel to direction $\Gamma$, and which meshes with a sprocket wheel 16 driven in rotation by a motor 17, such as, for example but not exclusively, a stepping electric motor. Thus, the control by the motor 17 of sprocket wheel 16 rotation results in a linear motion of the trolley 12 along the channel 11, in the direction $\Gamma$ and in both directions. It should be noted that the motor 17 is fixed directly onto the chassis 2.

In order to allow a movement of the marking implement 5, parallel to plane P and perpendicular to plane P', the movement means 10 also include an oscillating cradle 20 which is fitted to the trolley 12 so as to be able to pivot in relation to the latter on an axis $\Omega$ parallel to direction $\Gamma$ and therefore perpendicular to plane P.

It should be noted that, in the example illustrated, the trolley 12 is positioned on the face of the guidance channel 11 oriented toward the surface S, while the cradle 20 is connected to the trolley 12 on a face of the latter that is also oriented toward the surface to be marked, so that the cradle 20 is located opposite to the channel 11 in relation to the trolley 12. Likewise, the marking means 4 and, more particularly, the point 5 are fitted onto the cradle 20, opposite to the trolley 12, so that the point 5 is located close to the surface S to be marked, as will be seen in what follows.

With a view to controlling the rotation of the cradle 20 carrying the marking means 4 and, more particularly, the point 5, the movement means 10 also include motor means 21 for the movement in rotation, in both directions, of the cradle 20. The motor means 21 for the movement in rotation of the cradle 1 then include at least one arm 22 of which one end is connected to the cradle 20 and whose other end is located opposite to the first, on the other side of the guidance channel 1. In order to avoid any conflict with the guidance channel 11, in the example illustrated, the arm 22 is generally "C" shaped. The end of the arm 22 not connected to the cradle 20 is equipped with a toothed sector 23 which meshes with a sprocket wheel 24 driven by a motor 25 such as, for example but not exclusively, a stepping electric motor.

In the example illustrated, the motor 25 is attached to the trolley 12 and, more particularly, fixed onto its arm 14, so that all of the motor means 21 for driving the cradle 20 in rotation are subjected to linear motion at the same time as the trolley 10 of the marking implement formed by the point 5.

The movement means 10, as thus constructed, are used, through control by the motor 17, to provide a linear motion of the point 5 parallel to plane P' in the direction of double arrow $F_1$, while the control by the motor 25 is used to bring about a rotation of the point 5 in both directions, as indicated by arrows $F_2$. Combining the movements according to arrows $F_1$ and $F_2$ determines a marking window whose length is fixed by the amplitude of the linear motion in direction $\Delta$, and whose width is determined by the amplitude of the rotation around axis $\Omega$. It is then possible, by operating the electromagnetic system 4, to strike, with the point 5, any point located in the marking window, as thus determined.

However, it has emerged that for large rotary amplitudes around axis $\Omega$, the quality of the impacts of the point 5, close to the edges corresponding to maximum rotary amplitude, was not always of satisfactory quality. In order to overcome this fault, the invention proposes to implement means 30 to compensate for the effects of rotating the marking implement, that is the point 5, so as to guarantee the quality of the impacts of the point 5 on the surface S at all points of the marking window.

These compensation means 30 can be implemented in different ways, in particular depending on the method of implementation of the marking system and of the action of the movement means 10.

In the example illustrated, the marking system 4 is an electromagnetic micro-percussion system. Thus, the system 4 includes an electromagnetic solenoid 31, positioned in the body 32 of the system 4, with the said body 32 being fixed to the cradle 20. The marking system 4 also includes a ferromagnetic core 33, placed within the solenoid 31 and within the body 32, so as to be mobile in alternating linear motion in one marking direction D. The ferromagnetic core 33 is then mobile, between a rest position R, as illustrated by a solid line in FIG. 2, and a marking position M, shown with a broken line, also in FIG. 2. The ferromagnetic core 33 is intended to act upon the marking point 5 in order, by its alternating movement within the solenoid 31, to provide an alternating movement of the point 5 and therefore to allow the implementation of a series of micro impacts in the surface S to be marked. The marking point 5 is then also mobile, between a rest position, as illustrated in FIG. 2, and a marking position (not shown) in which it is in contact with the surface S. It should be noted that the marking point 5 is returned to the rest position by a spring 34 which tends, at all times, to maintain the end of the point 5 opposite to the surface S in contact with the mobile core 33. Given the presence of the spring 34, the rest position of the point 5 corresponds to, and is determined by, the rest position of the core 33.

In order to automatically correct the distancing of the point 5 in relation to the surface S which would be induced by the rotation around axis $\Omega$ of the cradle 20 and of the point 5 connected to it, the compensation means 30 include a mobile stop device 40 against which the core 31 rests in the rest position R. This mobile stop device 40, positioned behind the core, opposite to the point 5, is attached to a finger 41 which extends from the stop device 40 toward the trolley 12 and which then forms a cam that meshes with a cam race 42 created on the trolley 12. The track 42 is then shaped so that, during the rotation of the cradle 20 and therefore of the finger 41 which is attached to it, the stop device 40 moves so as to maintain more or less constant the distance between the end of the point 5 at rest and the surface S to be marked, where this distance is measured perpendicular to the surface to be marked. It should be noted that, given the existence of the compensation means 30 slaved to the rotation movement, the movement area of the position at rest R of the end of the point 5 is an area $S_1$ that is more or less parallel to the surface S to be marked while, in the absence of the compensation means, the rest position of the point would describe a cylinder of revolution.

According to the invention, the means to compensate for the rotation do not necessarily include a cam such as the finger 41, and a cam race such as surface 42. Thus, FIGS. 3 and 4 show one implementation variant of a marking device according to the invention, adopting, for the means 10 for movement of the marking implement, the same action as that described in relation to FIGS. 1 and 2, but for which the means to compensate for the rotation of the marking implement are implemented in a different way.

Figure 4:
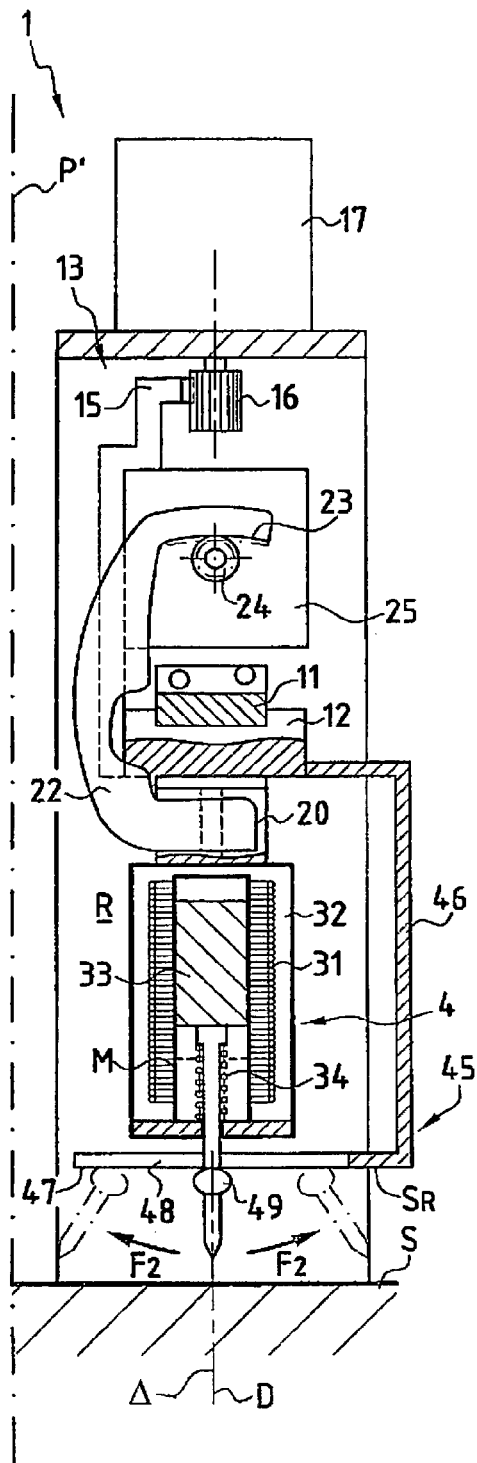
FIGS. 3 and 4 are views similar to FIGS. 1 and 2, showing an implementation variant of the compensation means.
Figure 3:
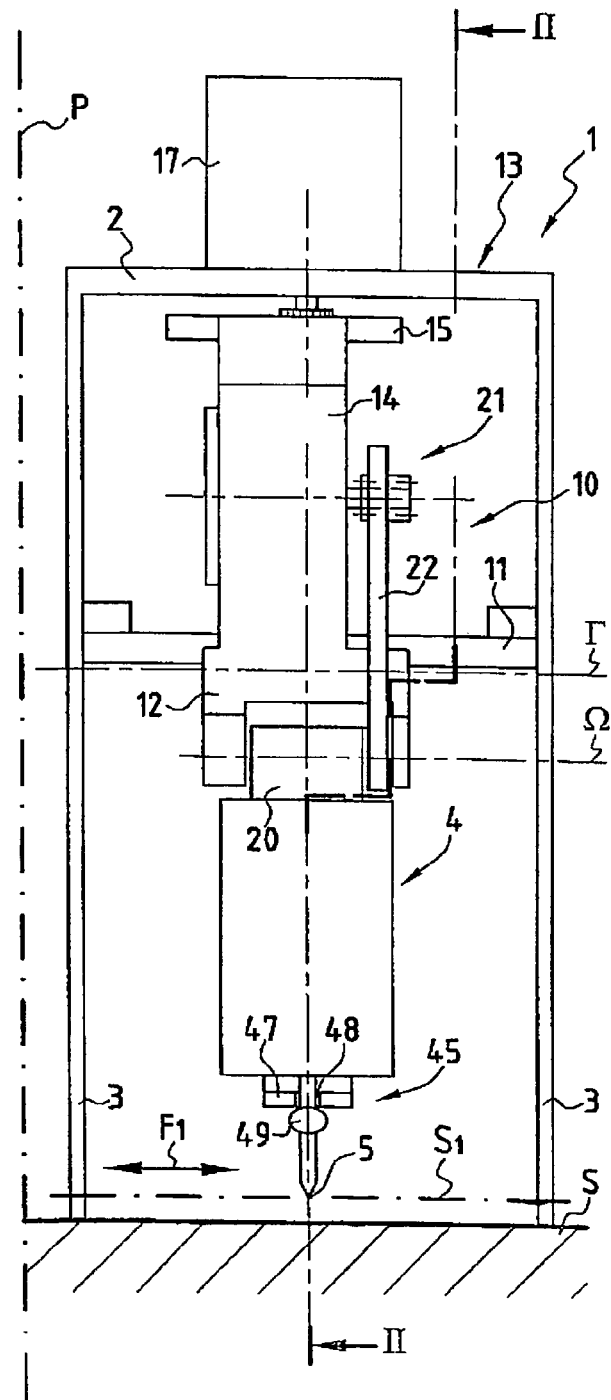

In fact, according to this implementation variant, illustrated in FIGS. 3 and 4, the compensation means include means 45 to determine a reference area $S_R$ which, in the example illustrated, is more or less parallel to the surface S, though here it is not a characteristic that is strictly necessary for the implementation of the invention.

In the example illustrated, the means 45 to determine the reference area $S_R$ include a support arm which is connected completely to the trolley 12 and which carries, at its end opposite to the trolley 12, a flat plate 47 in which is created a rectilinear groove 48 whose axis is perpendicular to the axis of rotation $\Omega$. The marking point 5 lies in this groove 48, where it is able to move during the rotation of the cradle 20. The marking point 5 then includes, as a connecting means 49 to the reference area $S_R$, a ball 49 that is held pressed by the spring 34 against the surface $S_R$, when the marking point 5 is in the rest position. Thus, when the solenoid 31 is not driven electrically and the core 33 is in its rest position, as is the point 5, then the means to determine the surface $S_R$ automatically give rise, during rotation of the cradle 20, to a linear motion of the point 5 in the rest position in direction $\Delta$, which here is common with the marking direction D.

According to the invention, the means to compensate for the rotation of the marking implement can be implemented in the context of other actions of the movement means than those described in relation to FIGS. 1 and 2.

Figure 6:
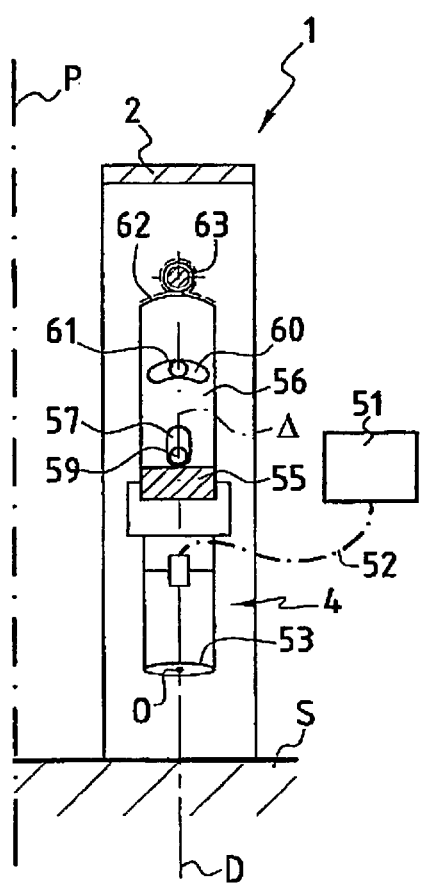
FIG. 6 is a schematic view in partial section along line VI-VI of FIG. 5.
Figure 5:
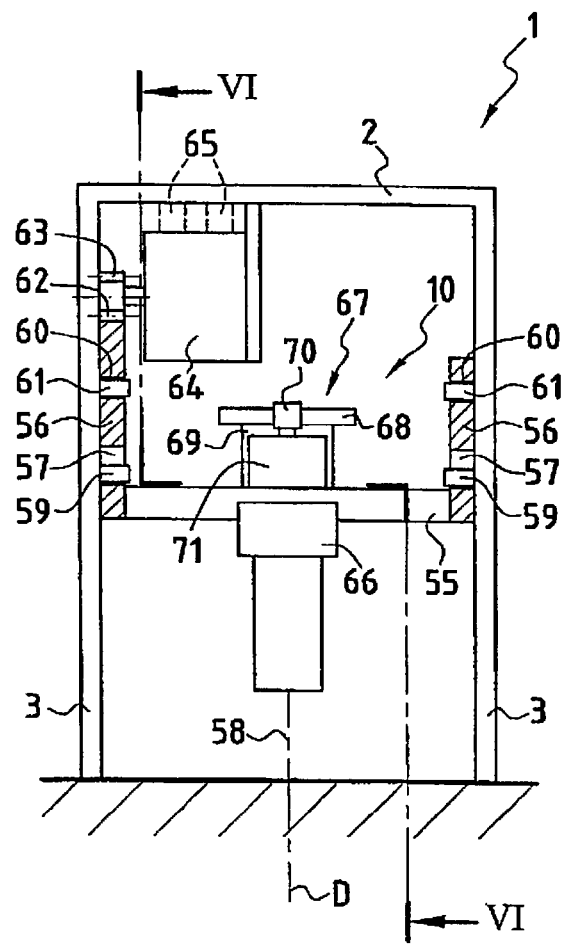
FIG. 5 is a view similar to FIG. 1, showing another method of implementation of a marking device according to the invention which differs from those illustrated in FIGS. 1 to 4 in the nature of the action of the movement of the marking implement, and in the method of implementation of the compensation means, as well as in the fact that it is using laser-type marking means.

Thus, FIGS. 5 and 6 show one method of implementation of a marking device according to the invention, which includes means to compensate for the rotation of the marking implement and in which the action of the movement means 10 differs from that described previously.

According to this method of implementation, the marking means 4 do not use micro-percussion techniques but rather laser techniques, and then include a laser source 51, such as a pulsed laser source, for example, whose beam is routed by an optical fibre or a harness of optical fibres 52 to a marking lens 53 which constitutes, in the context of the invention, the marking implement of the device 1.

According to this other method of implementation, the movement means 10 include a linear guidance channel 55 which follows a direction $\Gamma$, parallel to plane P' and to the surface to be marked S, and which is fitted to the chassis so as to be mobile at least in rotation around axis $\Omega$.

In the example illustrated, the linear guidance channel 55 is fixed, at each of its ends, to an arm 56 which also forms part of the means for movement in rotation of the guidance channel 55, as will be described below.

Each arm 56 includes, firstly, a rectilinear elongated aperture 57, on axis $\Delta$, parallel to the marking direction D determined by the laser beam 58. Each aperture 57 is then engaged on a pin 59 that is fully connected to the chassis 2, so that the pin 59 and the corresponding aperture 57 form a link with two degrees of freedom, one in rotation and one in translation or linear motion.

Each arm 56 includes, secondly, a window 60 which is curved inward, and forms a cam race for a cylindrical cam 61, connected to the chassis and engaged in the window 55.

Finally, one of the arms 56, which in this case is the left arm in FIG. 5, also has a toothed sector 62 which meshes with a sprocket wheel 63 that is driven by a motor 64, such as a stepping electric motor, for example. In the example illustrated, and in order to take account of the linear movement to which the arm 56 may be subjected, the motor 64 is mounted to pivot on the chassis 2 and the continuity of the meshing between the sprocket wheel 63 and the toothed sector 62 is ensured by at least one spring 65.

The movement means 10, according to this method of implementation illustrated in FIGS. 5 and 6, also include a trolley 66 which is fitted to the guidance channel 55 so as to be mobile in linear motion along the latter, and on which the marking implement, which in this case is the marking lens 53, is fitted. The trolley 66 is also associated with movement means in linear motion 67 which, in the example illustrated, include a rack 68 fitted to an arm 69 attached to the trolley 66 and meshing with a sprocket wheel 70 driven by a motor 71, such as a stepping electric motor, attached to the guidance channel 55.

Thus control by the motor 71 drives the trolley 66 in linear motion and therefore the marking lens, parallel to the channel 55, while control by the motor 64 drive a rotation of the arms 56 and therefore of the guidance channel 55 which pivots, so that the marking lens 53 is also moved in rotation.

In order to compensate for this rotation, each window 60 is then shaped to bring about, during the rotation of the guidance channel 55, a linear motion on axis Δ of this same guidance channel and therefore of the marking lens 53, so as to compensate for the effects of the rotation. Thus, in one method of implementation, each window 60 will be shaped so that the distance between the surface to be marked S and the optical centre O of the marking lens 53, is more or less constant and equal to the focal distance of the lens 53, this distance being measured perpendicular to the surface to be marked S.

According to this method of implementation, the compensation means of the marking lens and, more particularly, its optical centre, move in a plane or in a surface or area parallel to the surface to be engraved, when the laser marking spot describes the marking window, this surface, being located at a distance measured perpendicular to the surface to be marked that is more or less equal to the focal distance of the marking lens. Only partial compensation is then provided for the influence of the rotation on the position of the marking implement.

Nevertheless, in certain cases, for the purpose in particular of increasing the quality of the marking over all of the marking window, full compensation is provided for the rotation. The compensation means and, more particularly, the windows 60 will then be designed so that the distance, between the marking point and the optical centre of the lens, this time measured along the straight line determined by the laser beam, is equal to the focal distance. In this case, the movement area of the optical centre O of the marking lens 53 will no longer be a plane but will be a surface tangential to the plane, as determined previously, and located between this plane and the surface to be marked S.

According to the implementation examples illustrated in FIGS. 1 to 4, the motor 25, driving the oscillation of the marking system 4 around axis Ω, is attached to the trolley 12 by means of the arm 14. Nevertheless, the action, adopted in the examples of FIGS. 1 to 4, has the advantage that, in order to reduce the mass of the elements in motion, allows the motor 25 to be fixed directly to the chassis 2. The driving in rotation of the marking system 4 is then performed by an elongated sprocket wheel which extends over a part of the width of the chassis parallel to axis Ω and along which the toothed sector 23 moves in linear motion. To the extent that the fluted teeth of the sprocket wheel are parallel to axis Ω, there are then no obstacles to the linear motion of the trolley 12.

According to the examples described previously, the movement of the marking implement is achieved by combining a linear motion and of an axial rotation more or less perpendicular to the axis of linear motion. Nevertheless, according to the invention, the movement of the marking implement could also be obtained by combining two perpendicular axial rotations, the compensation means will then be designed to compensate automatically for the effects of each of the rotations on these two axes. According to the invention, the movement of the marking implement 5, 53, parallel to the movement plane P', is achieved by at least one rotation of the marking implement around an axis Ω' parallel to the other movement plane P.

Of course, various other implementation variants of the movement means and compensation means can be envisaged, in particular but no exclusively by combining different characteristics of the implementation examples described previously, to the extent that there is no incompatibility between them.

The invention claimed is:

1. A device for the marking of a surface including:
 a supporting chassis,
 marking means including a marking implement designed to create a point or a mark on said surface, and
 means for movement of the marking implement parallel to a first and a second plane of motion, said planes being perpendicular to each other and to the surface to be marked, in order to create two-dimensional symbols on the surface to be marked within a marking window, where the movement of the marking implement parallel to said first plane of motion is effected by at least one rotation of the marking implement around an axis parallel to said second plane of motion,
 wherein the means for moving the marking implement include at least:
  a linear guidance rail connected to the chassis and a trolley fitted to said rail to be mobile in linear motion in a direction parallel to said second plane of motion and to the surface to be marked,
  motor means for driving the trolley in linear movement in both directions along the linear guidance rail,
  an oscillating cradle, which is connected to the trolley on a face that is oriented toward the surface to be marked to pivot in relation to the trolley on said axis parallel to said second plane of motion, and which supports the marking implement opposite to the trolley,
  and motor means for the movement in rotation, in both directions, of the cradle on said axis parallel to said second plane of motion, and which include at least one arm, having first and second ends, the first end being connected to the cradle, and the second end being located opposite to the first end and equipped with a toothed sector engaging a sprocket wheel that is driven in rotation by a motor.

2. A marking device according to claim 1, wherein the motor means for movement in rotation are attached to the trolley.

3. A marking device according to claim 1, including means for the at least partial compensation of the influence of the rotation on the distance between the marking implement and the marking point on the surface to be marked.

4. A marking device according to claim 3, wherein the compensation means maintain at a constant value the distance, measured perpendicular to the marking surface, between the marking implement and the surface to be marked.

5. A marking device according to claim 3, wherein the compensation means maintain at a constant value the distance between the marking implement and the marking point on the surface to be marked.

6. A marking device according to claim 3, wherein the marking means include a micro-percussion system that uses, as its marking implement, a marking point that is mobile in alternating linear motion in one direction, called the marking direction, between a rest position and a marking position, with the rest position of the marking point being a reference for measuring the distance between the marking implement and the surface to be marked or the marking point.

7. A marking device according to claim 6, wherein:
 the micro-percussion marking system includes an electromagnetic solenoid, within which is placed a ferromagnetic core which acts upon the marking point, and which is mobile in linear motion in the solenoid, between said rest position and said marking position,
 and the compensation means include a mobile stop device against which the core rests in the rest position, and which is associated with a finger contacting a cam race attached to the trolley, so that a rotation of the cradle drives the movement of the finger along the cam race, whose profile changes the rest position of the core and of the marking point as a function of the angular position of the cradle.

8. A marking device according to claim 3, wherein the marking means include a laser source and, as a marking implement, a marking lens intended to focus a laser spot in one direction, called the marking direction, onto the surface to be marked, with the optical centre of the marking lens being a reference for measuring the distance between the marking implement and the surface to be marked or the marking point.

9. A marking device according to claim 3, wherein the compensation means induce a linear motion of the marking implement in a direction perpendicular to the axis of rotation of the cradle during the rotation of the marking implement.

10. A marking device according to claim 9, wherein the compensation means include at least one cam contacting a cam race whose profile is designed to induce the linear motion of the device in a direction perpendicular to the axis of rotation of the cradle.

* * * * *